United States Patent [19]

Scherping

[11] 3,997,147
[45] Dec. 14, 1976

[54] CONTINUOUS MIXER
[75] Inventor: Clarence K. Scherping, Saginaw, Mich.
[73] Assignee: Baker Perkins, Saginaw, Mich.
[22] Filed: Mar. 3, 1975
[21] Appl. No.: 554,569

Related U.S. Application Data
[62] Division of Ser. No. 355,755, April 30, 1973, Pat. No. 3,913,893.

[52] U.S. Cl. .............................. 259/191; 241/31; 241/98; 259/10; 425/208
[51] Int. Cl.² .......................................... B01F 7/08
[58] Field of Search ............... 259/9, 10, 109, 110, 259/191, 192, 193; 425/208; 241/31, 98, 101.5

[56] References Cited
UNITED STATES PATENTS

| | | | |
|---|---|---|---|
| 3,023,455 | 3/1962 | Geier et al. | 259/9 |
| 3,090,606 | 5/1963 | Burnet | 259/9 |
| 3,262,680 | 7/1966 | Balazer | 259/104 |

Primary Examiner—Richard E. Aegerter
Assistant Examiner—Richard R. Stearns

[57] ABSTRACT

A continuous mixer or kneader, particularly for explosive, potentially explosive, and other critical materials, wherein longitudinally split barrel sections are maintained closed by a mechanism which is actuated to instantly split the barrel sections under emergency conditions to permit the material inside to be treated to prevent or inhibit ignition of the material. The machine includes an extruding die and a cutter, for cutting extruded strands to lengths, which is coupled to the mixer shaft in the barrel, and in addition includes mechanism for interrupting the cutting of strands when the barrel sections are split.

11 Claims, 13 Drawing Figures

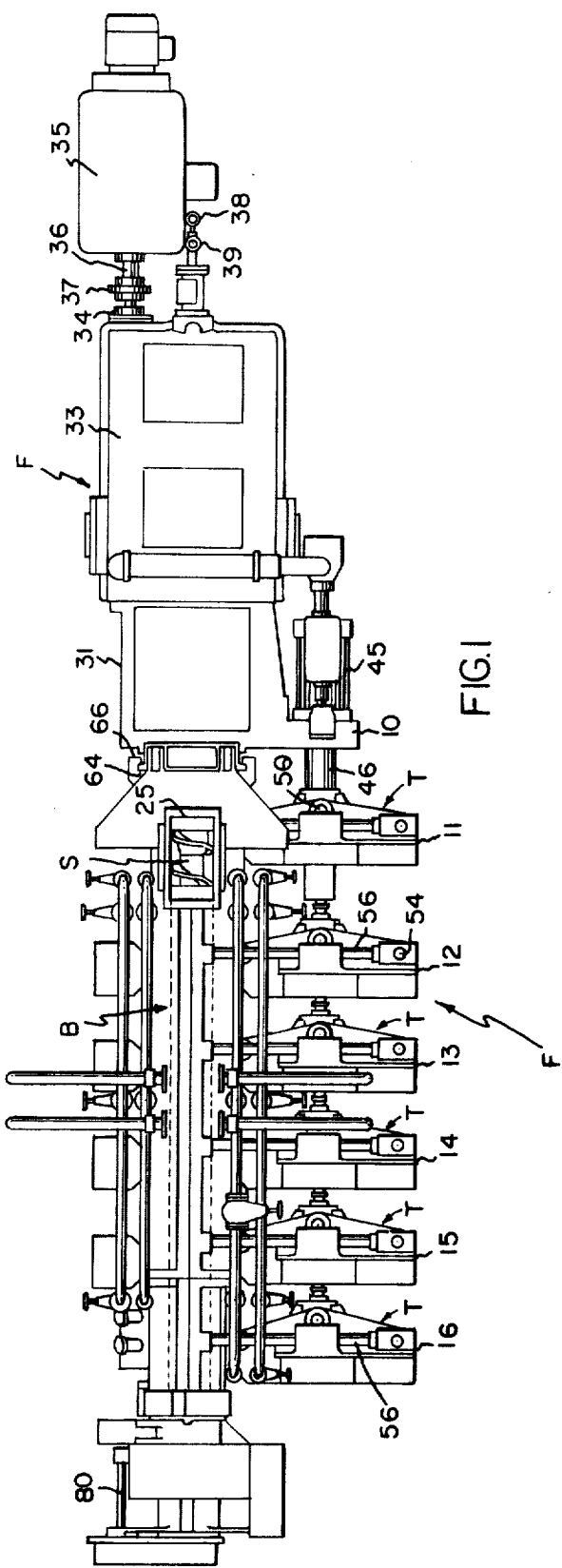

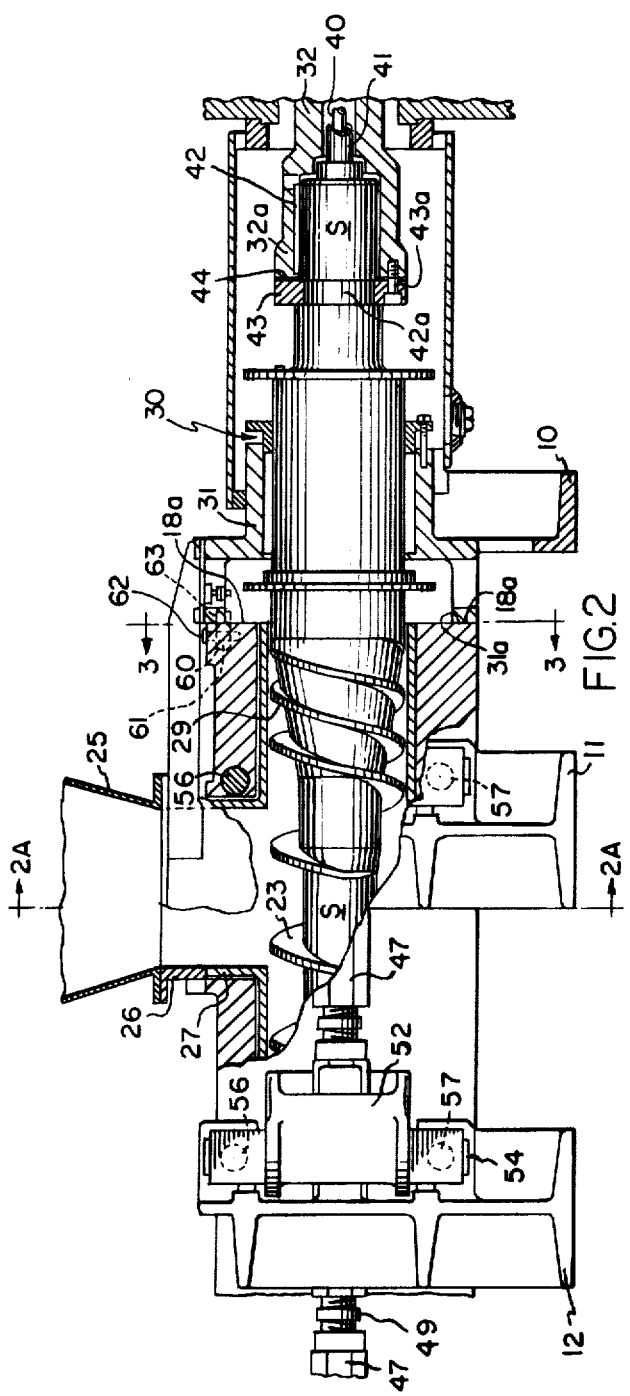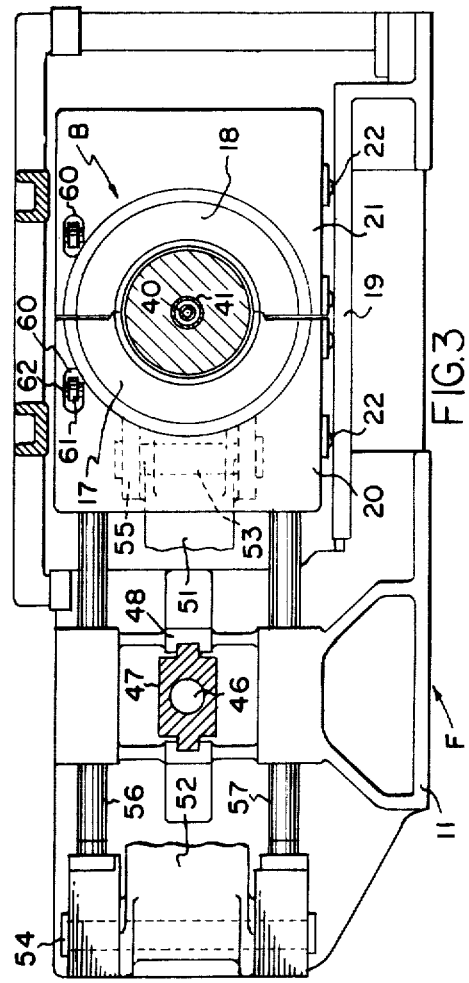

CONTINUOUS MIXER

BACKGROUND OF THE INVENTION

This application is a division of application Ser. No. 355,775, filed Apr. 30, 1973 now U.S. Pat. No. 3,913,893.

The invention relates particularly to mixers of the type which incorporate a mixing shaft which both revolves and reciprocates. Mixing is accomplished by interrupted helical threads or blades formed on the shaft which cooperate with stationary teeth projecting radially inwardly from the mixing barrel. Such machines operate continuously in the sense that material is continuously fed to one end and removed from the other in the form of extruded lengths or pellets. The present assignee's U.S. Pat. Nos. 3,023,455 and 3,143,768 well demostrate machines of the general character involved in this application.

The present invention deals with a mixer in which the barrel is formed of split sections which can be opened instantaneously in the event a dangerous condition develops. For instance, when handling dangerous material such as rocket fuel, it is desirable that the mixer halves separate immediately when a dangerous condition exists to provide access to the material being mixed so that it may be flooded with a quenching fluid which prevents or inhibits its ignition. A prime object of the invention is to provide a mixer of the character described wherein a cutter for severing the material extruded into lengths is moved to a position of temporary disablement when the kneading chamber halves open and returns immediately to operative position when the kneading chamber havles are once again closed.

Other objects and advantages of the present invention will become apparent to those of ordinary skill in the art as the description thereof proceeds.

SUMMARY OF THE INVENTION

This invention is concerned with a continuous mixer having an extruding head and a cutter for reducing extruded strands to lengths which may be well utilized for explosive materials, such as rocket fuel, and other critical materials wherein longitudinally split barrel sections are normally maintained closed, but may be instantly spread under emergency conditions to permit the material being mixed to be immediately flooded with quenching fluid or other wise treated to prevent or inhibit ignition. When the barrel is split, the construction is such that cutting is interrupted. This type mixer may also be utilized when processing temperature sensitive plastics such as thermosets or rigid polyvinyl chloride plastics which set up or degrade with upset conditions, and where extremely rapid opening may be desirable.

The present invention may more readily be understood by reference to the accompanying drawings in which:

FIG. 1 is a top plan view of my improved mixing machine;

FIG. 2 is an enlarged, partly sectional, fragmentary, side elevational view of the charge end of the machine;

FIG. 3 is a transverse sectional view taken on the line 3—3 of FIG. 2 and illustrating the two halves of the split mixer housing in closed position;

Figure 2A:
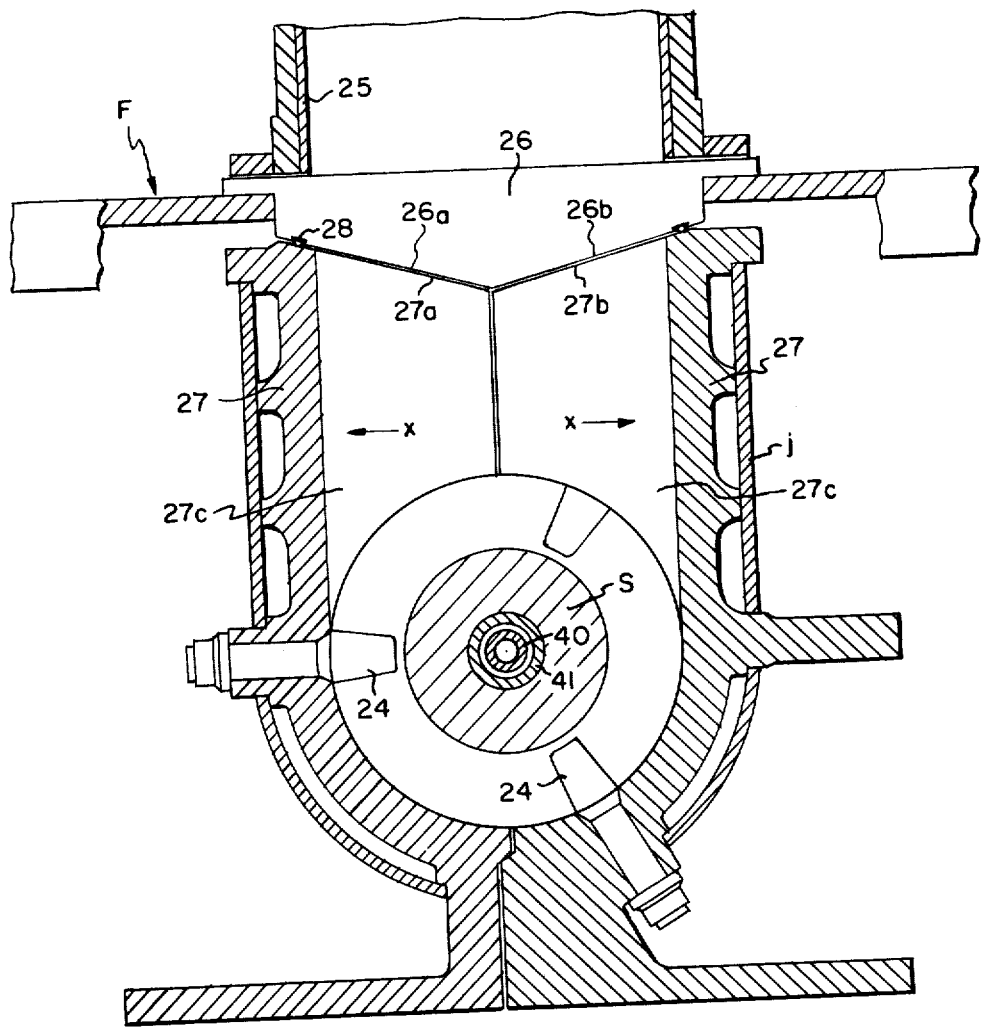
FIG. 2A is an enlarged transverse sectional view taken on the line 2A—2A of FIG. 2.

Referring now more particularly to the accompanying drawings, and in the first instance to FIGS. 1 and 2, a frame structure F is provided which includes a series of integrated support base or pedestal members 10 through 16. Slidably supported thereon in a manner which will be presently described, for transverse movement toward and away from a hollow mixer or kneading shaft, generally designated S, are the pair of semi-cylindrical mating housing or barrel halves, generally designated 17 and 18, which make up the mixer barrel B and move between the closed and open positions shown in FIGS. 4 and 5, respectively. The barrel sections 17 and 18 are separately jacketed as at $j$ and passages thus are provided for heating the barrel B or cooling it as desired, by circulating fluid therethrough. It should be understood that the barrel B is split along its vertical axis and sections 17 and 18 move horizontally toward and away from one another. As FIG. 5 particularly indicates, the bases 11 through 16 include table portions 19 on which the housing halves 17 and 18 move, the housing halves, including slide portions 20 and 21, mounted on roller bearings 22.

The shaft S, which is both reciprocated and rotated in the manner described in the present assignee's prior U.S. Pat. No. 3,023,455, which is incorporated herein by reference, has interrupted helical flights 23 which cooperate with lugs 24 mounted by the housing halves 17 and 18, when the housing halves 17 and 18 are in the closed position illustrated in FIG. 4.

At the charge end of the barrel B (FIGS. 2 and 2A), a material supply chute or hopper 25 is fixed to a stationary housing 26 fixed to the frame structure F and communicates with a pair of mating opening chute sections 27 extending from the split housing halves 17 and 18. The manner in which the two sections 27 seal to the stationary housing portion 26 and yet are so configured as to permit their virtually friction-free relative withdrawal in the directions indicated by arrows x is particularly illustrated in FIG. 2A. As is indicated in this FIGURE, the front and rear walls of the stationary frame portion 26 include downwardly coverging edge portions 26a and 26 b which mate with two complemental, upwardly diverging upper edge portions 27a and 27b of the housing end sections 27c. An O-ring 28 is provided to effect a seal between the edge portions 26a, 26b and 27a, 27b.

As FIG. 2 particularly indicates, the shaft S extends rearwardly of the material charging chute 25 and includes a tapering section on which full helical threads or flights 29 are provided to exert a forwarding effect on any material which tends to move rearwardly after being fed through the charging opening sections 27. At its rear end the shaft S passes through a stuffing box, generally indicated at 30 into a thrust yoke housing 31 and is coupled to the output shaft 32 (FIG. 2) of a gear reduction box 33 (FIG. 1). The input shaft 34 of gear box 33 is driven via a motor 35 which has its armature shaft 36 connected to it by a coupling 37 in the usual manner. The gear box 33 may be of the character illustrated in the aforementioned U.S. Pat. No. 3,023,455, wherein a reciprocating motion, as well as a rotary motion, is imparted to the shaft S to rotate it and reciprocate it in the FIG. 8 path indicated in the aforesaid patent in a manner to cooperate with the lugs 24 provided to project inwardly from the barrel halves 17 and 18.

Coolant supply and egress tubes 38 and 39 (FIG. 1) are provided to feed a pair of concentric inlet and outlet tubes 40 and 41 respectively (FIG. 2), which extend axially through the hollow shaft S as indicated in FIG. 2, it being understood that coolant is supplied through the inner tube 40 and then flows outwardly after proceeding the length of shaft S in the opposite direction in the usual manner, through the concentric space provided between the tubes 40 and 41 to the outlet 39.

As FIG. 2 indicates, the outer end of gear reducer output shaft 32 is yoke-shaped as at 32a and keyed as at 42 to the rear end of the shaft S. A split thrust collar 43, provided on a reduced shoulder portion 42a of shaft S, may be bolted as at 43a to the yoke 32a to connect the parts, and it will be observed that shims 44 may be provided between the collar 43 and the yoke 32a to control the axial position of shaft S and permit some variation thereof as desired.

By directly coupling the output shaft 32 of the gear box to the rear end of the shaft S in a manner which still permits adjustment of the axial position of the shaft S, the need for a bearing for the rear end of shaft S is eliminated, as is the costly and complicated coupling mechanism which has been conventionally employed.

Figure 4:
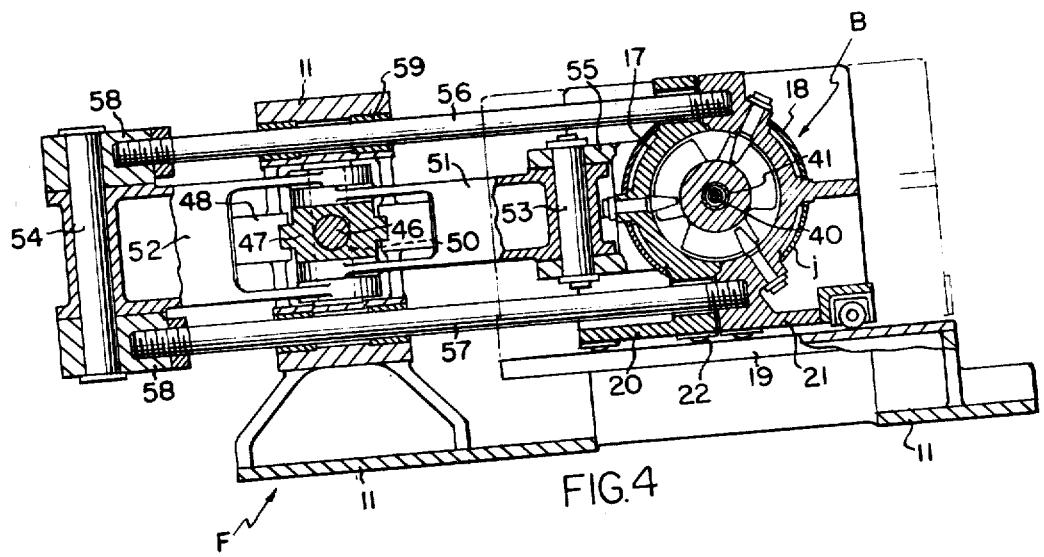
FIG. 4 is a similar, transverse sectional view, with parts broken away to more clearly depict the mechanism for moving the housing halves to and from closed position.
Figure 5:
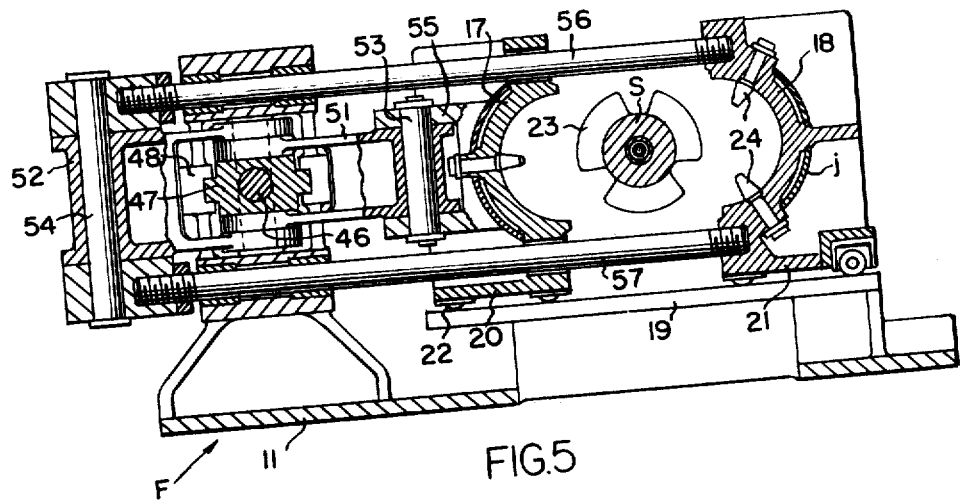
FIG. 5 is a similar view with the housing halves being shown in spread position.
Figure 6:
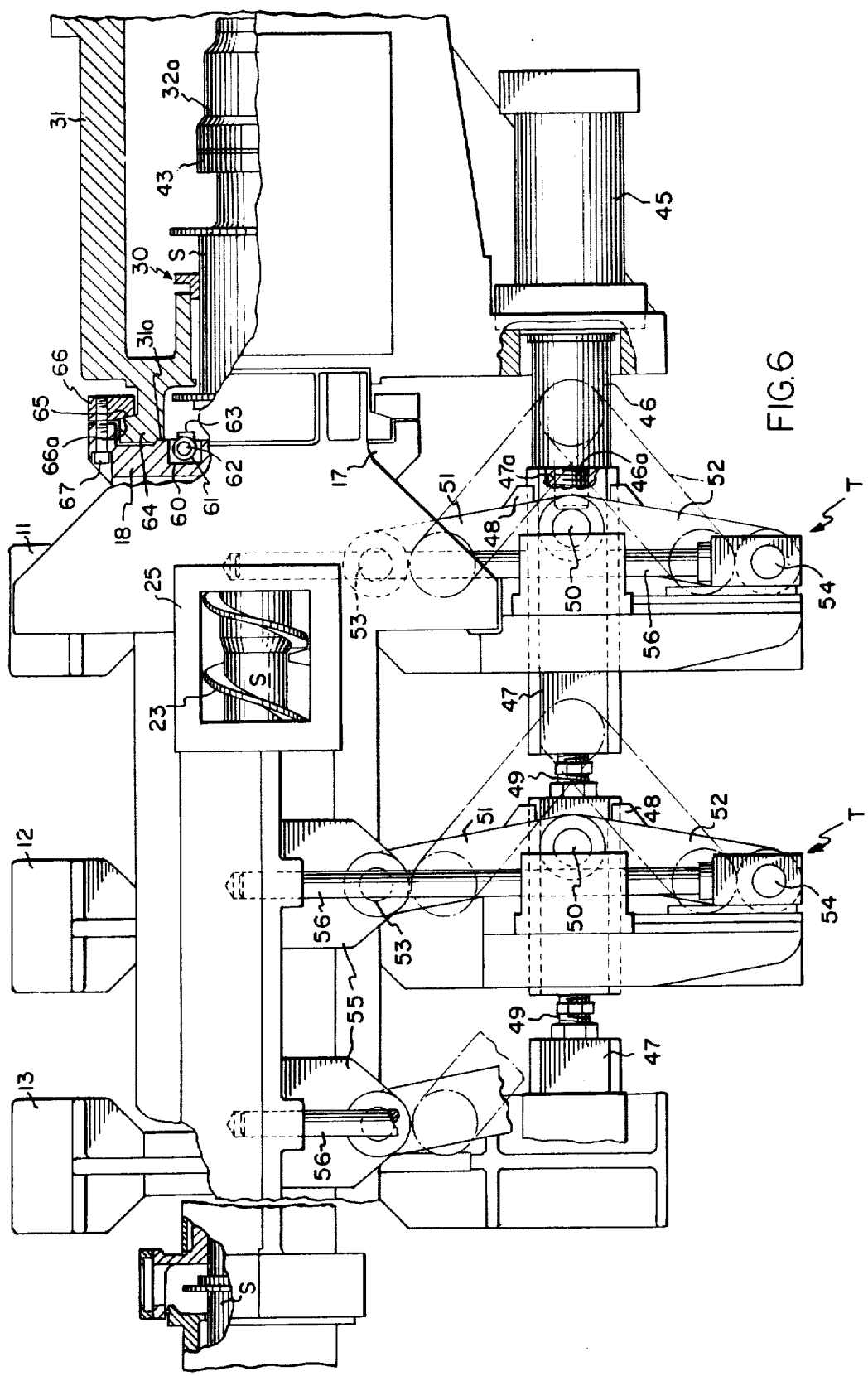
FIG. 6 is an enlarged, fragmentary top plan view of the charge end of the mixer, more particularly illustrating the longitudinally coupled toggle mechanism for actuating the housing halves and maintaining them in closed position.

FIGS. 4 through 6 particularly illustrate the longitudinally coupled series of toggle actuators generally designated T, for moving the housing halves 17 and 18 to and from closed positions. A hydraulic cylinder 45 (FIGS. 6 and 11) is activated to control this and includes a piston rod 46 which is threaded as at 46a into a threaded bore 47a in a longitudinal slide 47 received by slide guides 48. Similar slides 47 and guides 48 are provided at each of the bases or pedestals 11 through 16, and adjustable threaded couplings 49 are provided between each of the slides 47 to connect them together.

Each of the guides 48 mounts a pin 50 which extends above and below guide 48, and inner and outer toggle arm assemblies 51 and 52 respectively are pivotally carried on the ends of pins 50. The toggle arm assemblies 51 and 52 carry inner and outer pins 53 and 54 respectively. Mounted on each pin 53 is a yoke arm 55 which is welded to the barrel half 17. The opposite barrel half 18 is connected, via upper and lower tie rods 56 and 57, to a pair of tie rod clevises 58 which are mounted on the ends of pivot pins 54. The tie rods 56 and 57 are supported by bushings 59 provided in frame base members 11 through 16. When cylinder 45 is actuated all of the toggle mechanisms T cooperate in the manner indicated to open or close barrel halves 17 and 18.

As FIGS. 2 and 3 particularly indicate, both barrel halves 17 and 18, at their rear faces 17a and 18a, are provided with openings or recesses 60 to house rollers 61, mounted on vertical pins 62 in a manner to project slightly outwardly beyond the recesses or openings 60. Provided in the fixed housing portion 31, opposite the recesses 60 are opposite recesses or wells 63, situated so that when the barrel halves 17 and 18 are in the closed position, or substantially closed position, illustrated in FIG. 3, the rollers 61 will be opposite them in position to extend slightly into them. The front end of the stationary housing 31, which is supported on frame base 10, includes a shouldered portion 64 (FIG. 6) having beveled rear faces 65 adapted to be engaged by a pair of beveled thrust plates or strips 66 which are bolted, as at 67, to the housing halves 17 and 18. The beveled faces 66a of strips 66 are adpated to mate with faces 65. As the housing halves 17 and 18 move to closed position, the rollers 61 ride laterally along the front face 31a (FIG. 6) of housing part 31 until, when the housing sections 17 and 18 are virtually closed, the rollers 61 (which have been maintaining the barrel sections 17 and 18 slightly axially spaced from face 31a) reach the recesses or openings 63 in the stationary housing 31. At this point the surfaces 65 and 66a come into engagement and, with further closing movement then of housing sections 17 and 18, the surfaces 65 and 66a axially move the barrel B sections 17 and 18 axially rearwardly a final sealing increment with the rollers 61 dropping slightly into the recesses 63 then axially opposite them.

In this condition of the parts, the barrel halves 17 and 18 are securely locked together and axially sealed against the fixed housing 31. The barrel B is securely axially locked so that it can handle the thrust forces generated by the blades of the screw shaft S as it mixes material. The clearances between the teeth 24 and the interrupted screw flights 23 are so arranged that the barrel halves can be horizontally opened at any time in any relative position of the interrupted helical flights 23 and mixing lugs 24.

Figure 7:
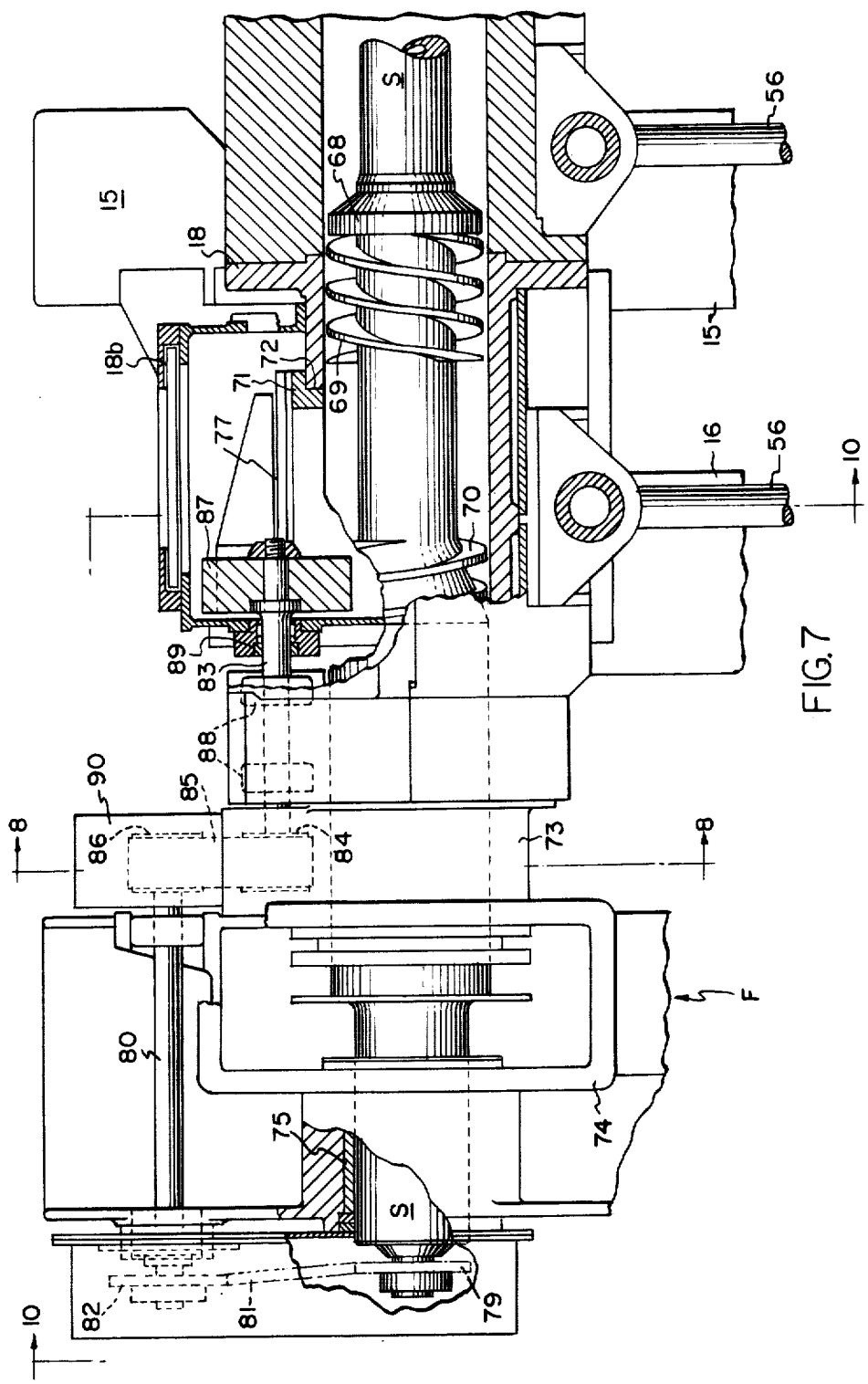
FIG. 7 is a similar, partly sectional, fragmentary, top plan view of the discharge end of the mixer, particularly illustrating the manner in which the receeiprocating and rotating mixer drive shaft is employed to drive the pelletizer cutter for severing the material into uniform lengths.

As FIG. 7 particularly indicates, the forward end of shaft S is provided with an orifice plug 68 around which material from the barrel chamber is extruded to a position forwardly of the orifice plug 68. The shaft S is also provided with helical advancing flights 69 separated by a gap of some distance from reversely pitched flights 70, which are also provided on the shaft S so that flights 69 and 70 generally straddle an extruding die 71 provided in an opening 72 in barrel half 18 in either reciprocated position of shaft S. The shaft S projects forwardly through a stuffing box section 73 provided on a discharge end frame section 74, forming part of the frame structure F, which mounts a front end bearing or journal 75, as shown.

Figure 10:
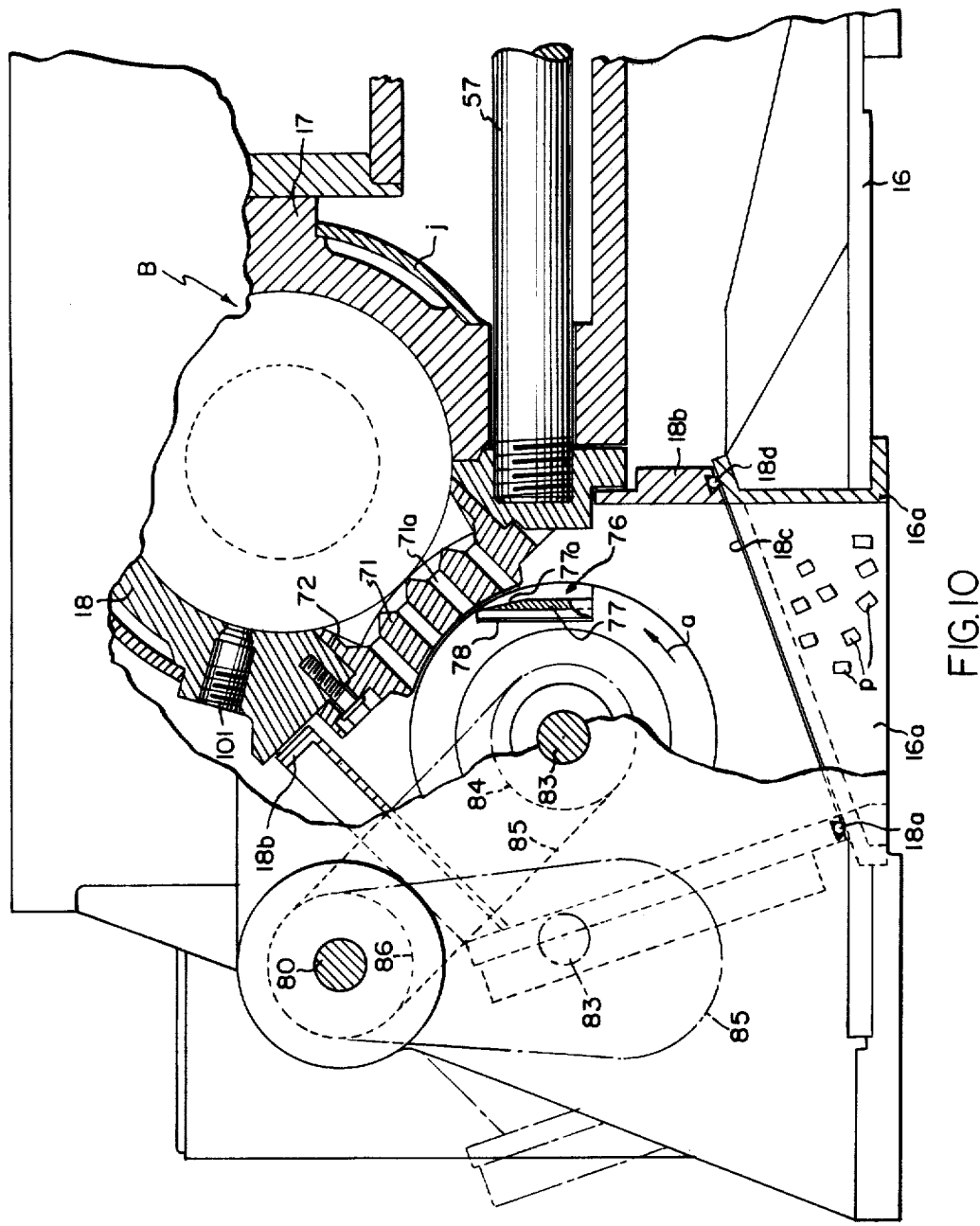
FIG. 10 is a transverse, sectional view on an enlarged scale, taken on the line 10—10 of FIG. 7, and more particularly illustrating the extrusion ports and severing knife and the manner in which the timing belt is controlled during opening of the mixer housing to prevent it from losing its position.

As FIG. 10 particularly indicates, the die 71 has generally radial extruding orifices 71a which cooperate with a cutting knife assembly, generally designated 76, which is rotated in the direction of arrow a. The knife assembly 76 includes a knife blade 77 relieved along its face as at 77a to permit material to issue from the extruding ports 71a after cutting has taken place, without binding. The blade 77 may be shimmed as at 78 to permit it to be set in the desired adjusted position.

The knife 77 is revolved in timed relation with the shaft S in a manner which will now be described. Mounted on the reduced forward end of shaft S is a sprocket 79 (FIG. 7) for transmitting rotation of shaft S to a generally parallel shaft 80 mounted by the fixed housing 74. A transversely flexing drive chain 81 is trained around the sprocket 79, and around a sprocket 82 provided on shaft 80. Mounted on the rear end of the knife spindle 83 is a driving timing sprocket 84 around which a timing belt 85 is trained which also is trained around a timing sprocket 86 provided on the shaft 80 so as to be driven thereby. The knife spindle 83, which mounts a flywheel 87 from which axially extending knife 77 projects, is journaled by bearings 88 mounted on the barrel portion 18 and extends through a stuffing box 89.

Figure 8:
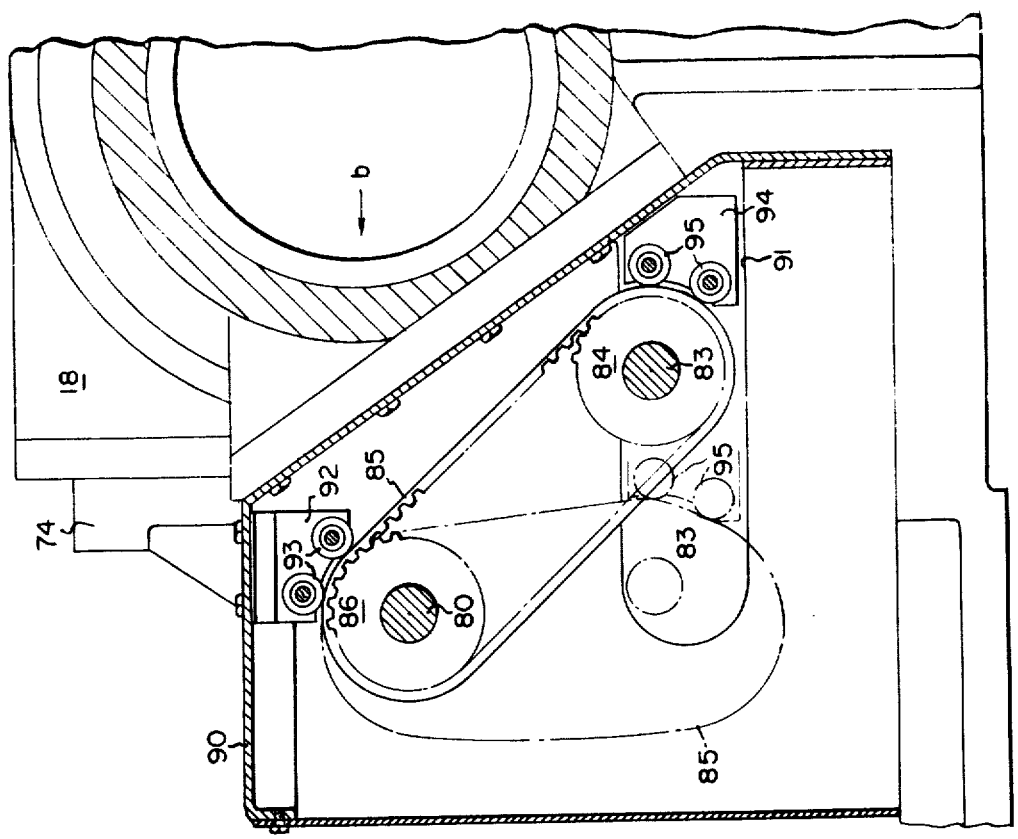
FIG. 8 is an enlarged, fragmentary, transverse sectional view of the discharge end of the machine taken on the line 8—8 of FIG. 7, with chain lines illustrating the inoperative position assumed by the timing drive belt when the barrel halves are in open position.
Figure 9:
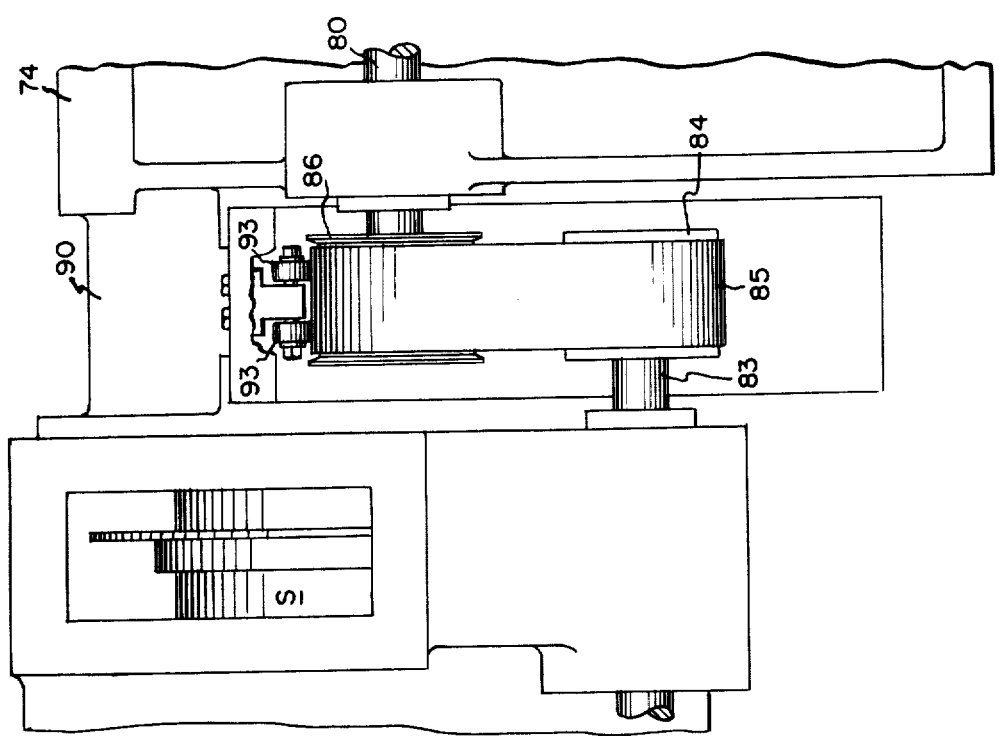
FIG. 9 is a fragmentary, side elevational view thereof.

A guard housing 90 provided for the knife mechanism is secured to the stationary housing 74 and is slotted as at 91 (FIG. 8), for a purpose which will presently become apparent. At the upper end of guard housing 90, a bracket 92 mounts a pair of idler rollers 93 as shown in FIG. 8, in engagement with the outer surfaces of the timing belt 85 maintaining the belt engaged with the upper timing sprocket 86. An opposite timing sprocket 84 is mounted on the outer end of the knife spindle 83. A bracket 94, mounted by the movable barrel housing 18, mounts a similar pair of idler rollers 95 which, when the barrel housing half 18 moves laterally outwardly in the direction of the arrow b in FIG. 8, the lower end of the timing belt 85 and the sprocket wheel 86 laterally move to the laterally outer position shown in chain lines in FIG. 8. When this happens, the distance between the sprocket wheels 84 and 86 decreases and slack is provided in the timing belt. The idler rollers 95 maintain the belt 85 in engagement with the lower sprocket wheel 84 to maintain the timed position of the timing belt 85.

Provided on the discharge housing 18, to move therewith, is a pellet collecting housing 18b, as shown particularly in FIGS. 7 and 10. The pellet housing 18b, which has a discharge opening 18c, is mounted on a wedge-shaped stationary discharge chute 16a supported by the base portions 15 and 16. An O-ring 18d carried by the housing 18b seals off the pellets or lengths of plastic p which are passing through the discharge opening 16a. The housing 18b moves laterally with the barrel housing portion 18 when the latter is separating from the barrel housing portion 17 and also returns with it.

Figure 11:
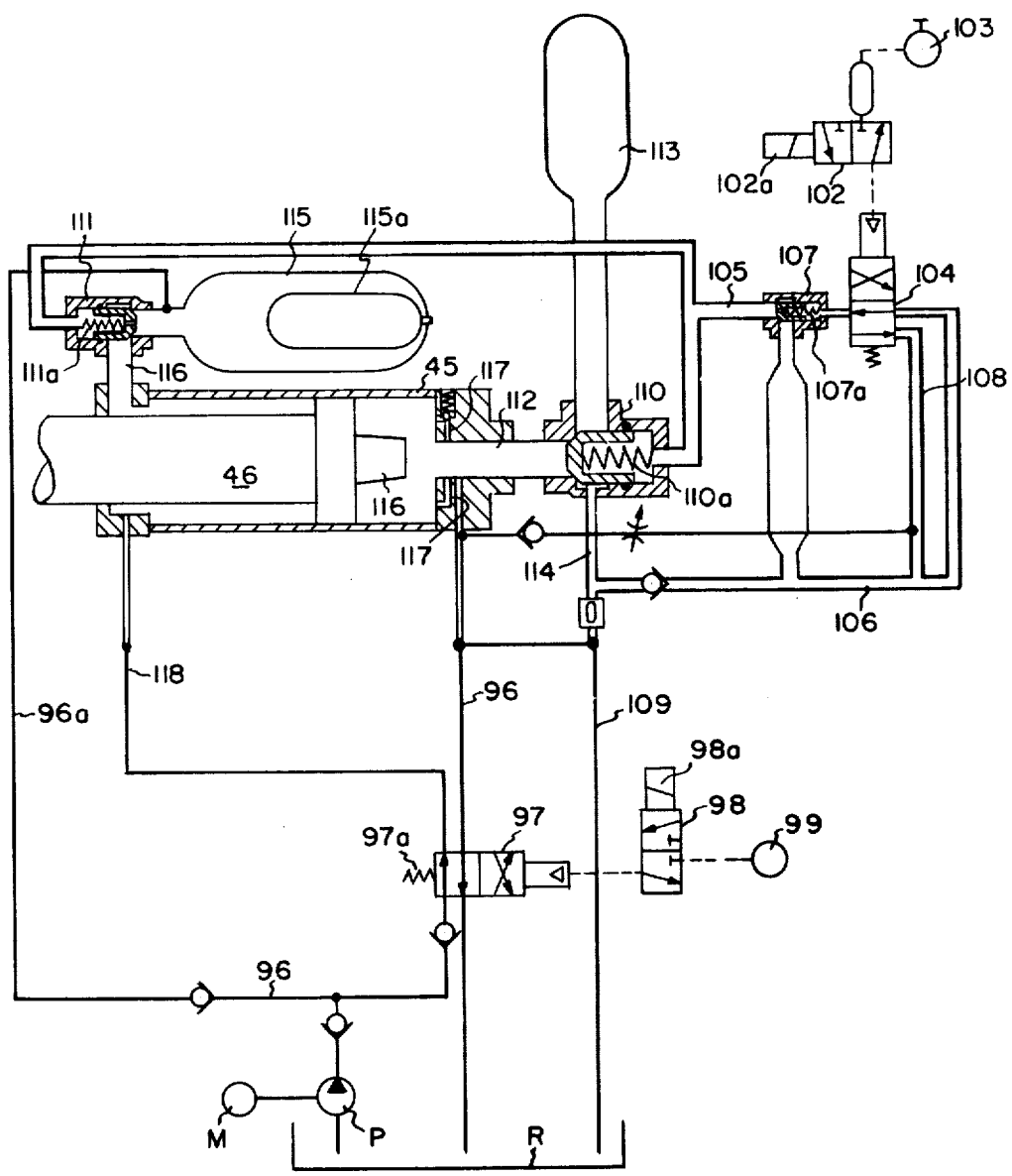
FIG. 11 is a schematic hydraulic diagram illustrating the control system for opening the mixer on either an emergency or normal basis.
Figure 12:
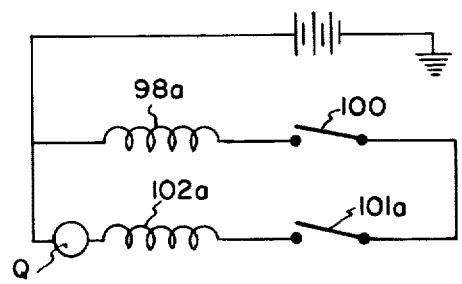
FIG. 12 is a typical electrical control circuit for operating the hydraulic circuit.

In FIG. 11, I have shown a typical hydraulic control circuit in which a pump P, driven by a motor M, is utilized to supply oil under a predetermined pressure, i.e., 2100 p.s.i., to the cylinder 45 to maintain the cylinder 45 activated and keep the barrel halves 17 and 18 in closed position. A line 96, which is connected to the head end of cylinder 45, passes through an air-operated, spring returned control valve 97 which is either closed or opened dependent upon the condition of a solenoid control valve 98, which either admits or prevents the admission of air from an air source 99 which operates to actuate the valve 97. The solenoid 98a of control valve 98, as shown in FIG. 12, is in series circuit with a manually actuated, two-position holding switch 100 which is operative to energize the solenoid 98a, and which would operate valve 98 to permit air pressure to place valve 97 in the position in which it passes oil to the right end of cylinder 45 and permits it to be removed from the left end of cylinder 45 and proceed back to the reservoir R.

Normally the solenoid 98a is energized to permit the air pressure from source 99 to maintain the valve 97 in the opposite position from which it is shown in FIG. 11. When it is desired to open the housing halves 17 and 18, the piston 46 of cylinder 45 must be moved from left to right in FIG. 11 and the switch 100 is released to deenergize solenoid 98a, which discommunicates the source of air 99 from the valve 97 and communicates atmospheric pressure with the valve 97 so that the spring 97a of valve 97 is free to return the valve 97 and permit fluid to flow from the right end of cylinder 45 down through the line 96 and back to reservoir R. A series of temperature and pressure sensors are provided in communication with the barrel to indicate when a pre-explosive condition exists within the barrel in the rocket propellant mixture therein. One of these pressure sensors is, for instance shown at 101 in FIG. 10 and simply operates to make contacts 101a in a series circuit with the operating solenoid 102a of a valve 102, when a predetermined pressure is exceeded. When this occurs, valve 102 is energized to admit air from a source 103 to operate an air operated, spring returned, control valve 104.

Provided in the line 105 is a spring operated spool or dump valve 107 which is situated in line 105, and operation of valve 104 in the manner indicated opens the dumping valve 107 to a line 108 which leads via line 106 back to line 109, proceeding to reservoir R. At the same time this relieves the pressure on dumping valves 110 and 111 and the lack of oil pressure which formerly maintained them in position permits the valves 110 and 111 to be moved out of the positions in which they are shown in FIG. 11. This opens the line 112 communicating with the head end of cylinder 45 to an auxiliary reservoir 113 which is also connected via line 114, it will be noted, to drain line 109. At the same time it permits the accumulator 115, which may be typically under a pressure of 2100 p.s.i., to force oil therein through the line 116 to the left end of cylinder 45 and substantially instantaneously move the piston rod therein from left to right in FIG. 11 to permit the extremely rapid separation of barrel halves 17 and 18. The accumulator 115 may be of the type wherein a resilient bladder 115a is provided within a steel cylinder and filled with sufficient nitrogen under pressure to maintain the oil in the cylinder 115 at a predetermined pressure. The bladder 115a permits the control of the amount of oil discharged by the accumulator 115 but does not control its pressure. The pressure is controlled via the line 96a which leads to pump P.

During the extremely rapid left to right movement of the piston rod 46 of cylinder 45, a cushioning effect is obtained at the very end of the stroke by a cushioning plug or piston 116 which enters line 112 and traps some oil ahead of the piston and cylinder 45 (which can only then egress through the much smaller ball checked egress ports 117). Once the barrel halves 17 and 18 have been opened on an emergency basis in the manner described, the quenching spray nozzles Q are immediately operated to flood the material in the mixer with a quenching fluid such as water. The pressure in the system will gradually equalize as oil drains from the auxiliary reservoir 113 via line 109 to the reservoir R and eventually the springs 107a, 110a and 111a will return the dumping valves 107, 110, and 111 to the position in which they are shown in FIG. 11. Switch 101a is a manually resettable switch which is only closed by the pressure or temperature switches in the barrel of the housing.

To reclose the housing halves 17 and 18 after either normal or emergency opening, it is merely necessary to close the switch 100 manually, which operates to energize solenoid 98a and communicate air pressure from source 99 with the control valve 97, causing it to be activated to overcome the spring 97a permit oil to travel to the front end of cylinder 45 via line 96 and to exit from the opposite end of cylinder 45 via line 118 and back to reservoir R.

In operation, the piston rod 46 of barrel opening and closing cylinder 45 is normally in the forward position in which it is shown in FIGS. 1 and 6 to place toggles 51 and 52 in the positions they are shown in FIGS. 4 and 6 in which they maintain the barrel section 17 and 18 closed even though the pressure condition in the material within the barrel B may reach a pressure of as much as 500 p.s.i. Assuming the barrel B is empty or substantially empty of material, it may be desirable to open the barrel sections 17 and 18 to the position shown in FIG. 5 which can be accomplished by simply manually opening switch 100. This deenergizes solenoid 98a and permits the spring 97a of valve 97 to move the valve 97 to the position shown in FIG. 11, in which oil is fed through line 118 to the left end of cylinder 45 and returned via line 96 from the right end of cylinder 45 to the reservoir R.

The traction of the piston rod 46 will move the toggles 51 and 52 to the position shown in diagrammatic lines in FIG. 6 and spread the barrel sections 17 and 18 to the position shown in FIG. 5. As the barrel section 17 and 18 commence to move laterally, the roller 61 carried by each which protrudes slightly from its well 60, moves laterally away from the well 63 in the housing 31 in which it formally was received, and bore on the confronting face of housing 31 to axially force the sections 17 and 18 an increment forwardly toward the discharge end of the machine. Thus, in proceeding laterally, the barrel sections 17 and 18 do not generate any frictional drag against the front surfaces 31a of housing 31. At the same time, the pellet housing 18a moves laterally outwardly with the barrel housing half 18 and the timing belt 85 moves from the position shown in broken lines in FIG. 10 to the vertical position shown in diagrammatic lines, while, of course, still remaining trained around the cutter spindle shaft 83 which moves with the barrel section 18. To restore the barrel sections 17 and 18 to the closed position shown in FIG. 4, it is merely necessary to operate switch 100 to close and energize solenoid 98a. This, then, moves the valve 97 to a position in which the pump 96 supplied oil via line 96 to the right end of cylinder 45 while permitting it to egress from the left end of cylinder 45 via line 118. The rollers 61 carried by the barrel sections 17 and 18 travel then laterally along the front face 31a of frame section 31 until they reach a position opposite the wells 63 formed in the front face 31a of section 31. At this point the wedging action of surfaces 65 and 66a serves to move the barrel sections 17 and 18 in a forward direction toward the charge end of the mixer in the manner previously indicated.

The timing belt 85 which has been maintained in position during separating movement by the rollers 93 and 95 is returned to the position shown in broken lines in FIG. 10, as is the cutter wheel 84 which returns the knife 76 to the position adjacent die 71, also shown in FIG. 10. Because of the relative slope of chute 16a and the bottom of pellet housing 18b, no appreciable friction is generated by withdrawal of section 18b. This is also true when the inlet hopper sections 27 are withdrawn laterally as indicated in FIG. 2a.

The mixer will open on an emergency basis in the manner indicated previously, when the pressure or temperature switch 101a is closed and solenoid 102a is energized.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A continuous mixer for explosive material and the like comprising:
    frame support means;
    a mixing barrel thereon including a plurality of longitudinally split barrel sections forming an axially extending passage having an inlet and an outlet, at least one of said barrel sections being movable between a closed, radially inner barrel forming position and a radially outer, open position;
    an axially disposed mixing shaft mounted in said passage;
    means mounting said barrel and said shaft for relative movement to mix material supplied to said inlet while moving it from said inlet to said outlet;
    means for moving at least said one barrel section between said radially inner position and said radially outer position so that the material in said chamber will be exposed;
    means at said outlet for extruding said material in strands and cutting said extruded strands into lengths; and
    means responsive to said one section being moved to said open position for interrupting the cutting of said strands.

2. A continuous mixer for explosive material and the like comprising:
    frame support means;
    a mixing barrel thereon including a plurality of longitudinally split barrel sections forming an axially extending passage having an inlet and an outlet, at least one of said barrel sections being movable between a closed, radially inner barrel forming position and a radially outer, open position;
    an axially disposed mixing shaft mounted in said passage;
    die means at said outlet for extruding material in strands;
    means mounting said barrel and said shaft for relative movement to mix material supplied to said inlet while moving it from said inlet to said outlet;
    cutting means at said outlet for cutting the strands to lengths; and means for moving at least said one barrel section between said radially inner position and said radially outer position so that the material in said chamber will be exposed; and means coupling said mixer shaft and said cutting means for operation in timed relation.

3. The mixer as set forth in claim 3 including sprocket wheels driven by said mixer shaft and driving said cutting means, said coupling means comprises timing belt means trained around said sprocket wheels; said cutting means is mounted for movement with said one barrel section to move said sprocket wheels together and provide slack in said timing belt means; and means for maintaining said timing belt means in engagement with said sprocket wheels when said sprocket wheels are moved together.

4. The mixer as set forth in claim 3 wherein said means for maintaining said timing belt means in engagement with said sprocket wheels comprises cam rollers mounted for movement with said one barrel section.

5. The mixer as set forth in claim 2 wherein said cutting means comprises a spindle shaft mounting a fly wheel for supporting a cutting knife blade.

6. The mixer as set forth in claim 5 wherein said knife blade includes a cutting edge generally parallel to the axis of said spindle shaft.

7. The mixer as set forth in claim 6 wherein said extruding means includes a concave extruding face, shaped to match the arc of said cutting edge, for receiving said cutting blade.

8. A continuous mixer for processing material comprising: frame support means, a mixing barrel thereon including a plurality of longitudinally split barrel sections, forming an axially extending passage having an inlet and an outlet, at least one of said barrel sections being movable between a closed, radially inner barrel forming position, and a radially outer, open position; an axially disposed mixing shaft mounted in said passage; means mounting said barrel and said shaft for relative movement to mix material supplied to said inlet while moving it from said inlet to said outlet; means for moving at least said one barrel section between said radially inner position and said radially outer position so that the material in said chamber will be exposed; die means at said outlet for extruding said material in strand form; and cutter means at said die means, and operating conjunctively therewith, mounted for movement with said one barrel section responsively to said barrel section being moved to said open position, for interrupting the cutting of said strands.

9. The mixer as set forth in claim 8 wherein decoupleable means couples the mixer shaft and cutter means for operation in timed relation.

10. The mixer as set forth in claim 9 including sprocket wheels driven by said mixer shaft and driving the cutter means, and wherein the coupling means includes a timing belt trained around the sprocket wheels and the sprocket wheel driving the cutter means is mounted for movement with the said one barrel section; and means is provided for maintaining the timing belt in engagement with the sprocket wheels when the sprocket wheels are moved relatively even though slack is provided in the timing belt when said one barrel section is moved to the open position.

11. The mixer as set forth in claim 8 wherein the cutter means is mounted for return movement with said one barrel section, responsively to said barrel section being moved to said closed position, to resume a cutting position.

* * * * *

UNITED STATES PATENT AND TRADEMARK OFFICE
CERTIFICATE OF CORRECTION

PATENT NO. : 3,997,147
DATED : December 14, 1976
INVENTOR(S) : Clarence K. Scherping It is certified that error appears in the above-identified patent and that said Letters Patent are hereby corrected as shown below:

Column 1, line 34, change "havles" to -- halves -- .

Column 2, line 14, change "receiprocat-" to -- reciprocat- -- .

Column 3, line 7, change "coverging" to -- converging -- .

Column 4, line 32, change "adpated" to -- adapted -- .

Column 6, line 39, after "to" (first occurrence) insert -- a -- .

Column 7, line 18, after "97a" insert -- and -- .

Column 9, line 7, change "claim 3" to -- claim 2 -- .

Signed and Sealed this

Twenty-ninth Day of March 1977

[SEAL]

Attest:

RUTH C. MASON
Attesting Officer

C. MARSHALL DANN
Commissioner of Patents and Trademarks